US008761699B2

(12) United States Patent
Li et al.

(10) Patent No.: US 8,761,699 B2
(45) Date of Patent: Jun. 24, 2014

(54) EXTENDABLE-ARM ANTENNAS, AND MODULES AND SYSTEMS IN WHICH THEY ARE INCORPORATED

(75) Inventors: Qiang Li, Gilbert, AZ (US); Jon T. Adams, Scottsdale, AZ (US); Olin L. Hartin, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 193 days.

(21) Appl. No.: 13/339,165

(22) Filed: Dec. 28, 2011

(65) Prior Publication Data

US 2013/0171951 A1 Jul. 4, 2013

(51) Int. Cl.

| | |
|---|---|
| ***H04B 1/04*** | (2006.01) |
| ***H01Q 1/38*** | (2006.01) |
| ***H01Q 9/04*** | (2006.01) |
| *H01Q 9/28* | (2006.01) |
| *H01Q 9/42* | (2006.01) |

(52) U.S. Cl.

CPC ............... *H01Q 1/38* (2013.01); *H01Q 9/0485* (2013.01); *H01Q 9/285* (2013.01); *H01Q 9/42* (2013.01); *H01Q 9/0421* (2013.01)

USPC .................... 455/129; 343/700 MS; 343/793; 343/795; 343/846

(58) Field of Classification Search

CPC ....... H01Q 9/0485; H01Q 9/42; H01Q 9/285; H01Q 9/0421; H01Q 1/38

USPC .......... 455/81, 129, 575.7, 562.1, 575.5, 120; 343/700 MS, 793, 795, 859, 895; 333/26, 260

See application file for complete search history.

(56) References Cited

U.S. PATENT DOCUMENTS

| | | | | |
|---|---|---|---|---|
| 5,550,554 A * | 8/1996 | Erkocevic | ..................... | 343/828 |
| 6,072,434 A * | 6/2000 | Papatheodorou | ...... | 343/700 MS |
| 6,268,831 B1 * | 7/2001 | Sanford | ........................ | 343/702 |

(Continued)

FOREIGN PATENT DOCUMENTS

| | | |
|---|---|---|
| EP | 2339693 A1 | 6/2011 |
| WO | 2009014554 A1 | 1/2009 |

OTHER PUBLICATIONS

Ali, et al., "Analysis of Integrated Inverted-F Antennas for Bluetooth Applications," Antennas and Propagation for Wireless Communications, p. 21-24; Nov. 2000.

(Continued)

*Primary Examiner* — Marceau Milord
(74) *Attorney, Agent, or Firm* — Sherry W. Schumm

(57) ABSTRACT

Embodiments of antennas and radio frequency (RF) modules include a substrate, a first antenna arm coupled to the substrate, and a first conductive structure between a distal end of the first antenna arm and a bottom surface of the substrate. An embodiment of a system includes a first substrate, a first conductive structure on a top surface of the first substrate, and an antenna coupled to the top surface of the first substrate. The antenna includes a second substrate, a first antenna arm coupled to the second substrate, and a second conductive structure having a proximal end and a distal end. The proximal end of the second conductive structure is coupled to a distal end of the first antenna arm, and the distal end of the second conductive structure extends to a bottom surface of the second substrate and is coupled to the first conductive structure on the first substrate.

19 Claims, 6 Drawing Sheets

(56) References Cited

U.S. PATENT DOCUMENTS

| | | | | |
|---|---|---|---|---|
| 7,187,338 | B2 * | 3/2007 | Boyle et al. | 343/770 |
| 7,446,712 | B2 * | 11/2008 | Itoh et al. | 343/700 MS |
| 7,450,072 | B2 * | 11/2008 | Kim et al. | 343/700 MS |
| 7,535,431 | B2 * | 5/2009 | Rowell | 343/846 |
| 7,589,678 | B2 * | 9/2009 | Perunka et al. | 343/702 |
| 7,679,565 | B2 * | 3/2010 | Sorvala | 343/700 MS |
| 7,733,286 | B2 | 6/2010 | Chen et al. | |
| 7,768,471 | B2 | 8/2010 | Su et al. | |
| 7,796,086 | B2 | 9/2010 | Coskun et al. | |
| 7,916,086 | B2 * | 3/2011 | Koskiniemi et al. | 343/700 MS |
| 8,102,319 | B2 * | 1/2012 | Schlub et al. | 343/702 |
| 8,410,990 | B2 * | 4/2013 | Kazanchian | 343/841 |
| 8,514,138 | B2 * | 8/2013 | Hung et al. | 343/767 |
| 2006/0170598 | A1 | 8/2006 | Kwan et al. | |
| 2006/0262030 | A1 | 11/2006 | Bae et al. | |

OTHER PUBLICATIONS

Pinel, S., et al., "RF System-on-Package (SOP) Development for compact low cost Wireless Front-end systems," Microwave Conference, 32nd European; Sep. 2002.

Abedin, M.F., et al., "Modifying the Ground Plane and Its Effect on Planar Inverted-F Antennas (PIFAs) for Mobile Phone Handsets," IEEE Antennas and Wireless Propagation Letters, vol. 2, p. 226-229; 2003.

Chan, P.W., et al., "Dual-Band Printed Inverted-F Antenna for DCS, 2.4GHZ WLAN Applications," 2008 Loughborough Antennas & Propagation Conference, p. 185-188; Mar. 17-18, 2008.

Ling, C., et al. "Analysis and Application of an On-Package Planar Inverted-F Antenna," IEEE Transactions on Antennas and Propagation, vol. 55, No. 6, p. 1774-1780; Jun. 2007.

Lee, K., et al., "Bandwidth Enhanced Planar Inverted-F Antenna with Modified Ground Structure," Proceedings of Asia-Pacific Microwave Conference 2007; Dec. 2007.

* cited by examiner

EXTENDABLE-ARM ANTENNAS, AND MODULES AND SYSTEMS IN WHICH THEY ARE INCORPORATED

TECHNICAL FIELD

Embodiments relate to antennas, and modules and systems within which they are incorporated.

BACKGROUND

A typical antenna includes at least one conductive antenna arm connected through a transmission line to a receiver, transmitter or transceiver. To transmit a radio frequency (RF) signal, a transmitter (or the transmitter portion of a transceiver) applies an oscillating RF current to the antenna arm, and the antenna arm radiates the energy from the oscillating current onto the "air interface" as electromagnetic waves. To receive a signal, the antenna arm converts electromagnetic waves that impinge upon the antenna arm from the air interface into voltages, which are provided to a receiver (or the receiver portion of a transceiver).

Half-wave dipole antennas and quarter-wave vertical antennas are among the most commonly implemented types of antennas, and they may be designed to operate within a desired bandwidth with a specific center frequency. Often, influences external to the antenna may cause the operating bandwidth of the antenna to shift. For example, when the antenna is incorporated into a system, the proximity of other system components to the antenna may affect the center frequency of the operating band. When those influences are predictable, they may be accounted for in the antenna design. However, when those influences are not predictable, they may cause the center frequency of the operating band to shift in an undesirable manner when the antenna is incorporated into a system.

DETAILED DESCRIPTION

Embodiments include antennas configured to enable the electrical length of their antenna arms to be extended, and systems and modules within which such antennas are incorporated. More particularly, embodiments of antennas includes a substrate, one or more antenna arms coupled to the substrate, and one or more conductive structures between distal end(s) of the antenna arm(s) and a bottom surface of the substrate. According to further embodiments, the conductive structures may be coupled to tuning structure(s) on a separate substrate in order to extend the electrical length of the antenna arm(s). The use of the tuning structure(s) allows for adjustments to center frequencies of operating bands of antennas after the antennas have been fabricated. Although specific microstrip antennas, such as planar inverted-F antennas and dipole antennas, are discussed in detail below according to certain embodiments, it is to be understood that alternate embodiments may include differently configured half-wave dipole antennas, differently configured quarter-wave vertical antennas, Yagi-Uda antennas, and other types of antennas in which the electrical length of the antenna arm(s) affect the performance (e.g., the center frequency of the operating band) of the antenna. Accordingly, such alternate embodiments are intended to be included within the scope of the inventive subject matter.

Figure 1:
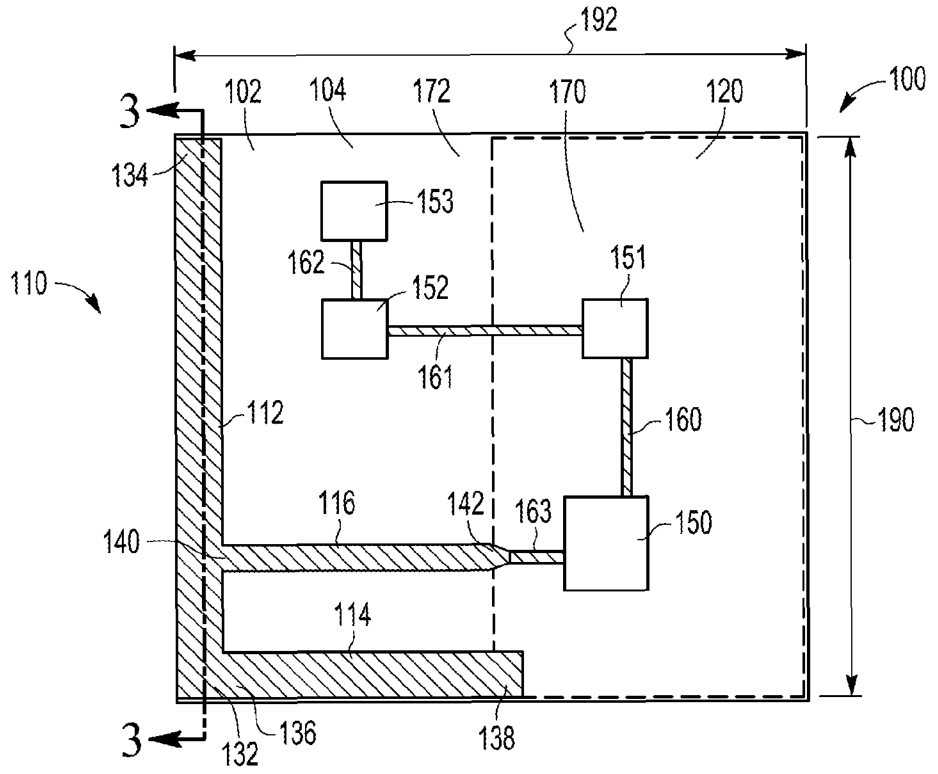
FIGS. 1-3 illustrate top, bottom, and cross-sectional side views, respectively, of a radio frequency (RF) module that includes a planar inverted-F antenna (PIFA), according to an example embodiment.
Figure 2:
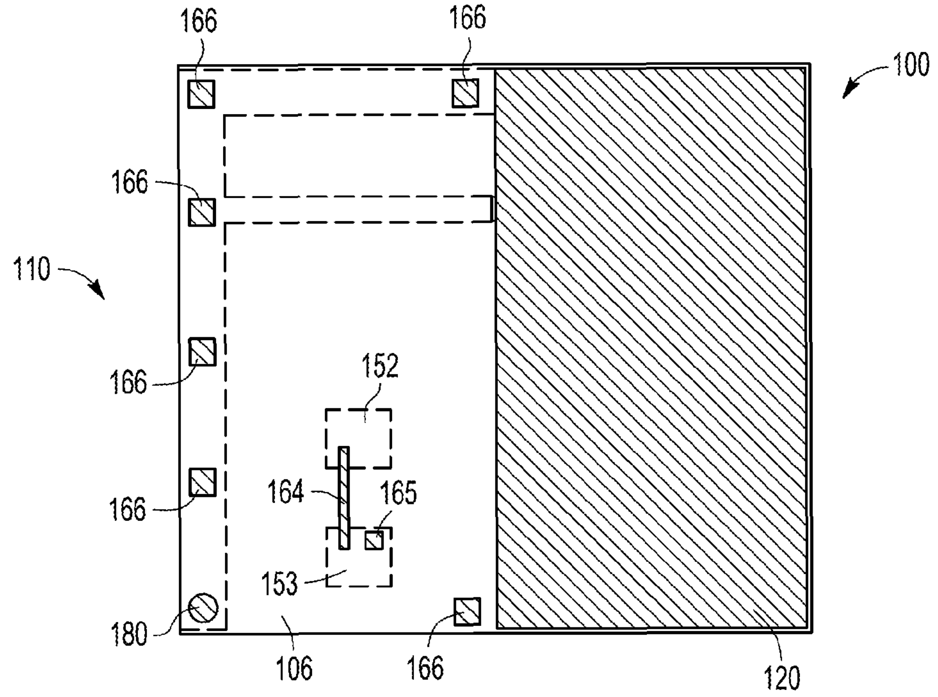
Figure 3:
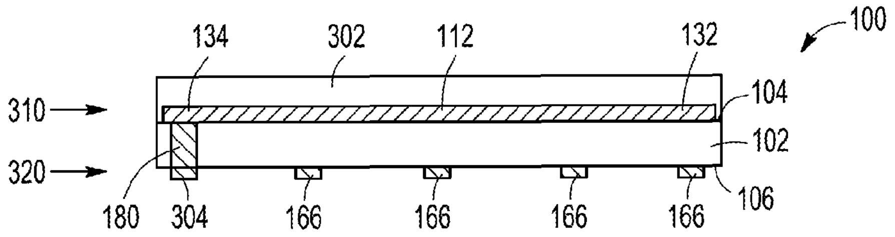

FIGS. 1-3 illustrate top, bottom, and cross-sectional side views, respectively, of a radio frequency (RF) module 100 that includes a dielectric substrate 102, a planar inverted-F antenna (PIFA) 110, and a ground plane 120, according to an example embodiment. Generally, FIG. 1 depicts PIFA 110 and other elements of module 100 that are located on the top surface 104 of the substrate 102, and FIG. 2 depicts ground plane 120 and other elements of module 100 that are located on the bottom surface 106 of the substrate 102. To more clearly illustrate and describe the various embodiments, however, ground plane 120 also is depicted in FIG. 1 (with a dashed border to indicate that it is not positioned on the top surface 104), even though ground plane 120 is not located on the top surface, in the illustrated embodiment. Similarly, PIFA 110 and various top-side electrical components 150-153 also are depicted in FIG. 2 (with dashed borders to indicate that they are not positioned on the top surface 104), even though PIFA 110 and electrical components 150-153 are not located on the bottom surface, in the illustrated embodiment.

Substrate 102 has a top surface 104, an opposed, bottom surface 106, and at least one dielectric layer between the top and bottom surfaces 104, 106. For example, substrate 102 may be a printed circuit board (PCB) or other dielectric substrate. In the embodiments described in detail below, substrate 102 consists of a single dielectric layer. In alternate embodiments, substrate 102 may include two or more dielectric layers and a metal layer between each of the dielectric layers. Substrate 102 has a thickness in a range of about 0.05 millimeters (mm) to about 5 mm, with a thickness in a range of about 0.1 mm to about 0.2 mm being preferred. According to a specific embodiment, substrate 102 has a thickness of about 0.1 mm. In addition, substrate 102 has a length 190 and a width 192 each in a range of about 15 mm to about 30 mm, with a length and a width in a range of about 20 mm to about 25 mm being preferred. According to a specific embodiment, substrate 102 has a length of about 20 mm and a width of about 25 mm. In other embodiments, substrate 102 may be thicker or thinner than the above-given ranges, and/or may have a length and/or width that are larger or smaller than the above-given ranges.

PIFA 110 forms a portion of a PIFA metal layer (e.g., layer 310, FIG. 3), and ground plane 120 forms a portion of a ground plane metal layer (e.g., layer 320, FIG. 3). In the illustrated embodiment, the PIFA metal layer is a patterned conductive layer on the top surface 104 of substrate 102, and the ground plane metal layer is a patterned conductive layer on a bottom surface 106 of the dielectric substrate 102. The PIFA metal layer may be considered to be a first metal layer (M1) of the module 100, and the ground plane metal layer may be considered to be a second metal layer (M2) of the module 100, where the M1 and M2 layers are separated by the dielectric material comprising substrate 102, in an embodiment. The PIFA 110 and the ground plane 120 are offset from each other, in that the PIFA 110 and the ground plane 120 are on different portions of substrate 102 (i.e., PIFA 110 does not overlie the ground plane 120). In other embodiments, particularly embodiments in which a relatively thick substrate 102 is used, the PIFA 110 may overlie the ground plane 120.

PIFA 110 includes an antenna arm 112, a shorting arm 114, and a feed arm 116. The antenna arm 112 has a proximal end 132 and a distal end 134. Similarly, the shorting arm 114 has a proximal end 136 and a distal end 138, and the feed arm 116 has a proximal end 140 and a distal end 142. The proximal end 136 of the shorting arm 114 is coupled with the proximal end 132 of the antenna arm 112 to define an open end at the distal end 134 of the antenna arm 112. The distal end 138 of the shorting arm 114 is coupled with the ground plane 120 through one or more conductive structures (not illustrated) that extend between the top and bottom surfaces 104, 106 of substrate 102 (i.e., the shorting arm 114 and the ground plane 120 are conductively or electrically coupled). The proximal end 140 of the feed arm 116 is coupled to the antenna arm 112 between the shorting arm 114 and the distal end 134 of the antenna arm 112. The distal end 142 of the feed arm 116 is coupled to a transmission line 163 (e.g., a 50-Ohm microstrip transmission line), which carries an RF signal to be radiated onto the air interface by the PIFA 110. A taper at the distal end 142 of the feed arm 116 is configured to compensate for the abrupt step transition encountered between the transmission line 163 and the PIFA 110. The input impedance of the PIFA 110 can be designed to have an appropriate value to match the load impedance, which may or may not be 50 Ohms.

Excitation of currents in the PIFA 100 causes excitation of currents in the ground plane 120. The resulting electromagnetic field is formed by the interaction of the PIFA 100 and an image of itself below the ground plane 120. Essentially, the combination of the PIFA 100 and the ground plane 120 operate as an asymmetric dipole. As is known by those of skill in the art, the various dimensions of the antenna arm 112, shorting arm 114, and feed arm 116, as well as the distance between the shorting arm 114 and the feed arm 116, among other things, can be adjusted to achieve a desired resonant frequency and bandwidth of the PIFA 100. According to an embodiment, antenna arm 112, shorting arm 114, and feed arm 116 are sized and arranged to have a resonant frequency within an ISM band (Industrial, Scientific, and Medical radio band). For example, according to a particular embodiment, antenna arm 112, shorting arm 114, and feed arm 116 are sized and arranged to have a resonant frequency within a frequency band spanning from about 2.400 gigahertz (GHz) to about 2.500 GHz, although antenna arm 112, shorting arm 114, and feed arm 116 may be sized and arranged to have a resonant frequency within other bands, as well.

Ground plane 120 has a length (horizontal dimension) and a height (vertical dimension), which define a total area occupied by the ground plane. The length of the ground plane 120 is less than about one quarter of the operating wavelength (i.e., $\lambda/4$). According to an embodiment, ground plane 120 has a length in a range of about 8 mm to about 15 mm, with a length in a range of about 10 mm to about 13 mm being preferred. According to a specific embodiment, ground plane 120 has a length of about 12 mm. Ground plane frame has a height in a range of about 15 mm to about 25 mm, with a height in a range of about 18 mm to about 22 mm being preferred. According to a specific embodiment, ground plane 120 has a height of about 20 mm. In other embodiments, the length and/or height of ground plane 120 may be larger or smaller than the above-given ranges.

According to an embodiment, RF module 100 also includes one or more electrical components 150, 151, 152, 153 which, in conjunction with PIFA 110 and ground plane 120 form an RF module configured to function as a transmitter, receiver, or transceiver. For example, but not by way of limitation, electrical components 150-153 may include one or more transceivers, transmitters, receivers, crystal oscillators, Baluns, or other components. In particular, for example, electrical component 150 may be a transceiver, Balun, or other component that supplies an RF signal to transmission line 163, which in turn, is coupled to the distal (input) end 142 of feed arm 116.

Figure 4:
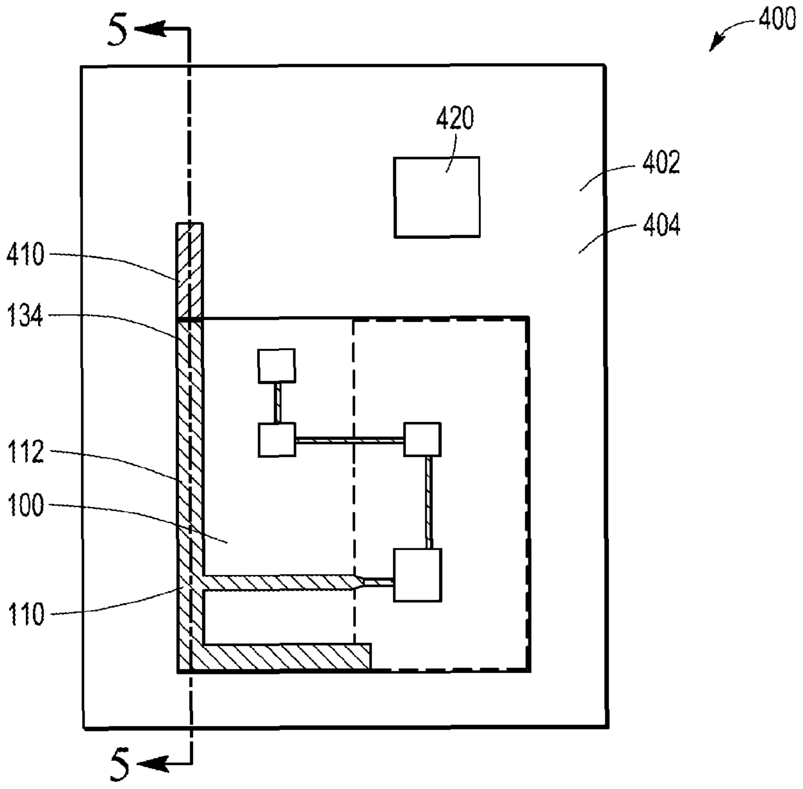
FIGS. 4 and 5 illustrate top and cross-sectional side views, respectively, of a system that includes an RF module (with a PIFA) coupled to a substrate that includes a tuning structure, according to an example embodiment.

Some of the electrical components 150, 151 are coupled to a portion 170 of the substrate 102 that overlies the ground plane 120, and others of the electrical components 152, 153 are coupled to a portion 172 of the substrate 102 that does not overlie the ground plane 120 or coincide with PIFA 110. Although FIGS. 3 and 4 depict electrical components 150-153 being coupled only to the top surface 104 of the substrate 102, it is to be understood that some or all of electrical components 150-153 also or alternatively could be coupled to the bottom surface 106 of the substrate 102, as long as those components 150-153 do not coincide with the ground plane 120.

RF module 100 also may include conductive interconnects 160, 161, 162, 163, 164 and other conductive structures 165, 166 (e.g., input/output pads and mechanical connection pads), in an embodiment. Some of the conductive interconnects 160-163 are coupled to the top surface 104 of substrate 102, and may provide routing (e.g., signal, ground, and so on) between electrical components 150-153 on the top surface 104. For example, as discussed previously, conductive interconnect 163 may be a transmission line (e.g., a 50 Ohm microstrip transmission line), which is coupled between component 150 and the distal (input) end 142 of feed arm 116. Other ones of the conductive interconnects 160-162 may provide top-surface routing between the various electrical components 150-153. According to an embodiment, conductive interconnects 160-163 form portions of the PIFA metal layer (or M1).

According to an embodiment, other ones of the conductive interconnects 164 and the other conductive structures 165, 166 are coupled to the bottom surface 106 of substrate 102. Conductive interconnects 164 also may provide routing between the electrical components on the top surface 104. More specifically, conductive interconnects 164 may provide bottom-surface routing between electrical components 152, 153 within portion 172 of substrate 102, in addition to the top-surface routing provided by conductive interconnects 162. Conductive structures 165 include I/O pads (or other structures), which may be electrically coupled with corresponding I/O pads (or other structures) on another substrate (e.g., substrate 402, FIG. 4). Conductive structures 166 include floating pads, in an embodiment, which may be soldered to corresponding floating pads on another substrate (e.g., substrate 402, FIG. 4) to provide mechanical connection between RF module 100 and the other substrate. In alternate embodiments, RF module 100 and the other substrate may be mechanically connected using pins, glues, or other means. According to an embodiment, conductive interconnects 164 and conductive structures 165, 166 form portions of the ground plane metal layer (or M2).

As depicted in FIGS. 2 and 3, RF module 100 also includes a conductive structure 180 between PIFA metal layer 310 (M1) and the bottom surface 106 of substrate 102, according to an embodiment. At the bottom surface 106, conductive structure 180 optionally may be coupled to a pad 304, which may be formed as a portion of ground plane metal layer 320 (M2). More particularly, conductive structure 180 is electrically connected to the distal end 134 of the antenna arm 112, and conductive structure 180 extends through substrate 102 to the bottom surface 106 of substrate 102 (e.g., to pad 304). As will be explained in more detail in conjunction with FIGS. 4 and 5, conductive structure 180 may be coupled (e.g., directly or using optional pad 304) to a tuning structure (e.g., tuning structure 410, FIG. 4) on a top surface of another substrate (e.g., substrate 402, FIG. 4). The tuning structure is a conductive structure that is configured to increase the electrical length of the antenna arm 112 when the antenna arm 112 is connected to the tuning structure using conductive structure 180.

Desirably, conductive structure 180 is configured to have approximately the same characteristic impedance as antenna arm 112, in order to minimize reflections. Conductive structure 180 may be a single via, as shown in FIGS. 2 and 3, in an embodiment. In an alternate embodiment, conductive structure 180 may include a plurality of vias. In yet another alternate embodiment, conductive structure 180 may be replaced by a planar conductive interconnect, such as a strip of metallization that wraps around an edge of the substrate 102 between the distal end 134 of the antenna arm 112 and the bottom surface 106 of the substrate 102. Conductive structure 180 may include a combination of one or more vias and planar conductive interconnects, in still other embodiments, or any other structure that provides electrical conductivity between the distal end 134 of the antenna arm 112 and the tuning structure (e.g., tuning structure 410, FIG. 4) on the substrate to which RF module 100 is attached.

According to an embodiment, and as depicted in FIG. 3 (but not in FIGS. 1 and 2), RF module 100 also may include encapsulation material 302 overlying the PIFA 110, the electrical components 150-153, and the top surface 104 of the substrate 102. With encapsulation material 302, PIFA 110 and electrical components 150-153 are protected from environmental and mechanical damage, and RF module 100 may be readily incorporated with other systems to provide RF communications capabilities to those other systems, as will be described further below.

In the above description, PIFA 110 and its corresponding ground plane 120 are included in different metal layers of a module. In alternate embodiments (not illustrated), a PIFA and its corresponding ground plane may be in the same metal layer of a module (e.g., both a PIFA and a ground plane could be printed on the same surface of the substrate). In addition, although the various embodiments discussed herein describe an RF module 100 with two metal layers (e.g., layers 310, 320, FIG. 3) and a single dielectric layer (e.g., substrate 102, FIG. 1) positioned between them, alternate embodiments may include three or more metal layers and two or more dielectric layers separating the three or more metal layers. The PIFA and ground plane may be in adjacent metal layers (i.e., metal layers separated by a single dielectric layer), as described above, or one or more metal layers (and two or more corresponding dielectric layers) may be intervening between the PIFA and the ground plane, in various alternate embodiments. Further, either or both the PIFA and the ground plane may be included as part of a metal layer that is between the surface metal layers (i.e., metal layers other than surface metal layers), in various embodiments. Although such alternate embodiments are not discussed in detail herein, those of skill in the art would understand, based on the description, how to modify the various embodiments discussed herein to produce such a system.

Further, although various electrical components 150-153, conductive interconnects 160-164, and conductive structures 165, 166 are illustrated in FIGS. 1-3 in various positions, it is to be understood that the numbers and arrangements of electrical components 150-153, conductive interconnects 160-164, and conductive structures 165, 166 included in FIGS. 1-3 were selected to facilitate explanation of the various embodiments, and the selected numbers and arrangements, along with the depicted interconnections between electrical components 150-153, are not to be construed as limiting.

Figure 5:
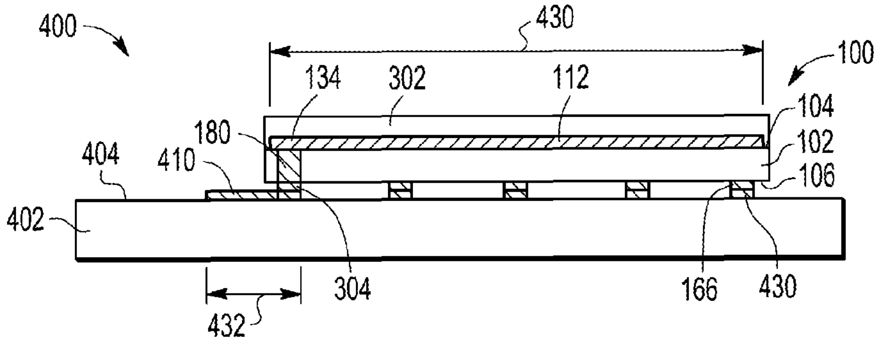

As mentioned above, embodiments of RF modules, such as RF module 100, may be incorporated into systems in which there is a desire to communicate information wirelessly. For example, FIGS. 4 and 5 illustrate top and cross-sectional side views, respectively, of a system 400 that includes an RF module (e.g., RF module 100 with PIFA 110) coupled to a substrate 402 (e.g., a PCB), according to an example embodiment. For convenience, the reference numbers used in FIG. 1 for various elements of RF module 100 are retained in FIGS. 4 and 5. In an embodiment, system 400 includes at least one non-RF component 420.

As discussed previously, RF module 100 includes a PIFA 110, a ground plane 120, and various electrical components (e.g., components 150-154, FIG. 1), which enable PIFA 110 to transmit RF signals over an air interface, receive RF signals from an air interface, or both. According to an embodiment, non-RF component 420 is configured to produce signals for transmission by RF module 100 and/or to consume signals produced by RF module 100 (based on RF signals that RF module 100 received from the air interface).

RF module 100, tuning structure 410, and non-RF component 420 are mechanically coupled to substrate 402. For example, RF module 100 may be mechanically coupled to substrate 402 using at least one conductive structure (e.g., conductive structures 166, such as floating pads), which may be soldered to at least one corresponding conductive structure 430 (e.g., other floating pads) on substrate 402. Non-RF component 420 may be similarly mechanically coupled to substrate 402. Alternatively, RF module 100 and/or non-RF component 420 may be mechanically coupled to substrate 402 using pins, glues, or other means. In addition, RF module 100 and non-RF component 420 may be electrically coupled to substrate 402 and to each other using various pads (not illustrated), vias (not illustrated), and conductive interconnects (not illustrated) on and/or through substrate 402. In this manner, RF module 100 and non-RF component 420 may exchange electrical signals.

The dielectric constant (or relative permittivity, Er) and thickness of substrate 402 may affect the resonant frequency of PIFA 110. For example, commonly-used substrates may have dielectric constants in a range of about 2.0 to 4.7, although substrates may have lower or higher dielectric constants, as well. In addition, the thicknesses of various PCBs may vary significantly. According to an embodiment, RF module 100 is designed to have a particular resonant frequency and bandwidth. In order to ensure that the desired resonant frequency is not shifted significantly due to the dielectric constant and thickness of substrate 402, tuning structure 410 is provided on substrate 402 to increase the electrical length of antenna arm 112, according to an embodiment. The configuration of the tuning structure 410 may be different on substrates having different dielectric constants and/or thicknesses, to ensure that the desired resonant frequency is achieved regardless of the dielectric constant and/or thickness of the substrate to which RF module 100 is coupled.

According to an embodiment, tuning structure 410 includes a patterned, planar conductive structure (e.g., a portion of a conductive layer) on a top surface 404 of substrate 402. In other embodiments, tuning structure 410 may be a conductive structure other than a patterned conductive structure. For example, tuning structure 410 alternatively may be a conductive bump, ball, plate, or via (e.g., a via into and/or through substrate 402). As discussed previously, tuning structure 410 is configured to increase an electrical length of antenna arm 112 when tuning structure 410 is electrically coupled (e.g., using conductive structure 180 and optional pad 304) to the distal end 134 of antenna arm 112. As shown in FIG. 4, tuning structure 410 may have an elongated shape that has a major axis (a vertical axis in FIG. 4) that is parallel with a major axis of antenna arm 112 (also vertical in FIG. 4). Alternatively, the major axes of tuning structure 410 and antenna arm 112 may not be parallel.

The configuration of tuning structure 410 defines the percentage increase in the electrical length of antenna arm 112 that tuning structure 410 provides. For example, the relative difference between the physical length 430 of antenna arm 112 and the physical length 432 of tuning structure 410 may relate to the percentage increase in the electrical length of antenna arm 112 that tuning structure 410 provides. Those of skill in the art would understand, based on the description herein, however, that the physical length 432 of tuning structure 410 would not be the only factor in determining the percentage increase in the electrical length of antenna arm 112 that tuning structure 410 provides.

The resonant frequency of system 400 relates to the electrical length of the entire combination of antenna arm 112, conductive structure 180, and tuning structure 410. According to an embodiment, tuning structure 410 accounts for about 10 percent or less of the electrical length of the entire combination of antenna arm 112, conductive structure 180, and tuning structure 410. According to another embodiment, tuning structure 410 accounts for up to 50 percent of the electrical length of the entire combination of antenna arm 112, conductive structure 180, and tuning structure 410. In still other embodiments, tuning structure 410 may account for more than 50 percent of the entire electrical length of each combination.

The various embodiments discussed above include an RF module 100 that includes a PIFA 110. In other embodiments, an RF module may include a different type of antenna. For example, FIGS. 6-12 depict embodiments of RF modules 600 that include a dipole antenna 610, and systems 900 within which such RF modules 600 are incorporated. A significant difference between the embodiments of RF modules that include a PIFA (e.g., RF module 100) and RF modules that include a dipole antenna (e.g., RF module 600) is that, in the RF modules that include a dipole antenna, the antenna is configured to enable the electrical length of both of its antenna arms (e.g., antenna arms 612, 613, FIG. 6) to be extended (e.g., using conductive structures 680, 681, 1010, 1011, FIG. 10).

Figure 6:
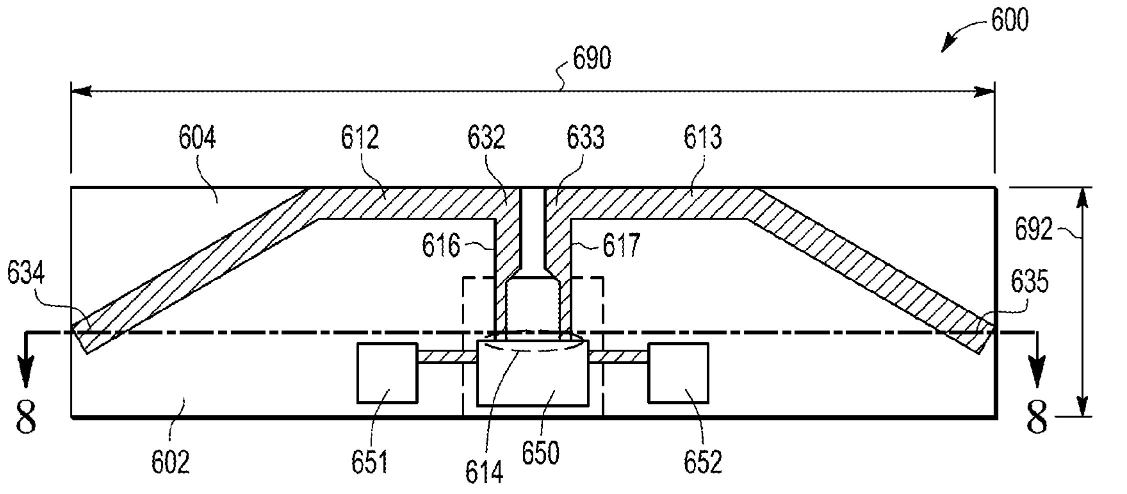
FIGS. 6-8 illustrate top, bottom, and cross-sectional side views, respectively, of an RF module that includes a dipole antenna, according to an example embodiment.

Except for the antennas 110, 610 themselves (and the lack of a ground plane in RF module 600, although one could be included), modules 100, 600 may have certain substantially common elements. For conciseness, all of the elements of module 100 have not been included in the illustrations of module 600, although module 600 may have many of the elements illustrated and discussed in conjunction with module 100. For example, only a few electronic components 650, 651, 652 and simple routing therebetween are illustrated in FIG. 6. It is to be understood that module may have more (or fewer components), top-side and bottom-side routing, and other features that may not have been specifically illustrated. In addition, in the description of module 600 and system 900, below, features that are analogous features of module 100 and system 400 may be discussed more concisely or not discussed at all. It is to be understood that the discussion of analogous features of module 100 and system 400 apply also to module 600 and system 900.

Figure 7:
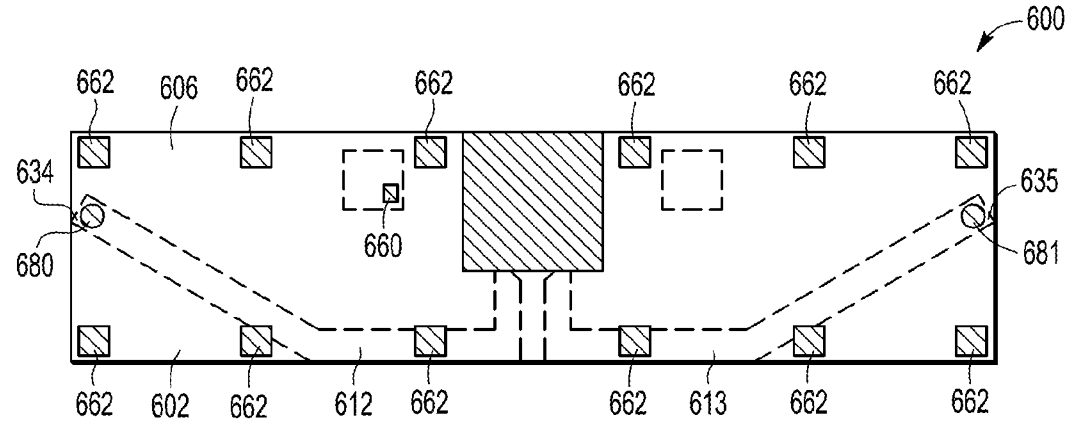
Figure 8:
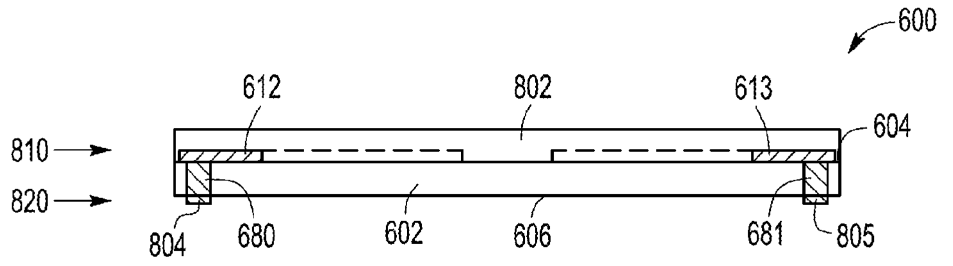

FIGS. 6-8 illustrate top, bottom, and cross-sectional side views, respectively, of an RF module 600 that includes a dielectric substrate 602 and a double-sided dipole antenna 610, according to an example embodiment. Generally, FIG. 6 depicts dipole antenna 610 and other elements of module 600 that are located on the top surface 604 of the substrate 602, and FIG. 7 depicts elements of module 600 that are located on the bottom surface 606 of the substrate 602. To more clearly illustrate and describe the various embodiments, however, dipole antenna 610 is depicted in FIG. 7 (with dashed borders to indicate that it is not positioned on the top surface 604), even though dipole antenna 610 and electrical components 150-153 are not located on the bottom surface, in the illustrated embodiment.

Substrate 602 has a top surface 604, an opposed, bottom surface 606, and at least one dielectric layer between the top and bottom surfaces 604, 606. For example, substrate 602 may be a printed circuit board (PCB) or other dielectric substrate. In the embodiments described in detail below, substrate 602 consists of a single dielectric layer. In alternate embodiments, substrate 602 may include two or more dielectric layers and a metal layer between each of the dielectric layers. Substrate 602 has a thickness in a range of about 0.05 millimeters (mm) to about 5 mm, with a thickness in a range of about 0.1 mm to about 0.2 mm being preferred. According to a specific embodiment, substrate 602 has a thickness of about 0.1 mm. In addition, substrate 602 has a length 690 in a range of about 20 mm to about 60 mm, with a length 690 in a range of about 30 mm to about 50 mm being preferred. Substrate 602 has a width 692 in a range of about 5 mm to about 20 mm, with a width 692 in a range of about 8 mm to about 12 mm being preferred. According to a specific embodiment, substrate 602 has a length of about 40 mm and a width of about 10 mm. In other embodiments, substrate 602 may be thicker or thinner than the above-given ranges, and/or may have a length and/or width that are larger or smaller than the above-given ranges.

Dipole antenna 610 forms a portion of an antenna metal layer (e.g., layer 810, FIG. 8), and other components (e.g., conductive structures 660) form portions of a lower metal layer (e.g., layer 820, FIG. 8). In the illustrated embodiment, the antenna metal layer is a patterned conductive layer on the top surface 604 of substrate 602, and the lower metal layer is a patterned conductive layer on a bottom surface 606 of the dielectric substrate 602. The antenna metal layer may be considered to be a first metal layer (M1) of the module 600, and the lower metal layer may be considered to be a second metal layer (M2) of the module 600, where the M1 and M2 layers are separated by the dielectric material comprising substrate 602, in an embodiment.

Dipole antenna 610 includes symmetrical antenna arms 612, 613 coupled at their proximal ends 632, 633 to parallel feed arms 616, 617 (i.e., the dipole antenna 610 is center fed). Antenna arms 612, 613 may include a single bend, as shown, or antenna arms 612, 613 may be differently shaped. For example, in other embodiments, antenna arms 612, 613 may be straight or curved, or may include multiple bends. Parallel feed arms 616, 617 transition to a coaxial unbalanced feed point 614 using linear tapers. An end launch connector (e.g., a 50-Ohm connector) is connected at the feed point 614. At the feed point 614, an RF signal is provided to the dipole antenna 610 from an electrical component 650 (e.g., a transmitter or transceiver) for radiation onto the air interface, or an RF signal intercepted by the dipole antenna 610 is provided to the electrical component 650 (e.g., a receiver or transceiver). According to an embodiment, antenna arms 662, 613 and feed arms 616, 617 are sized and arranged to have a resonant frequency within an ISM band, although antenna arms 662, 613 and feed arms 616, 617 may be sized and arranged to have a resonant frequency within other bands, as well.

According to an embodiment, RF module 600 also includes one or more electrical components 650, 651, 652 which, in conjunction with dipole antenna 610 form an RF module configured to function as a transmitter, receiver, or transceiver. For example, but not by way of limitation, electrical components 650-652 may include one or more transceivers, transmitters, receivers, crystal oscillators, or other components (a Balun may not be needed in antenna 610, but may be included). In particular, for example, electrical component 650 may be a transceiver or other component that supplies an RF signal to feed point 614, which in turn, is coupled to the input ends of feed arms 616, 617. Although FIG. 6 depicts electrical components 650-652 being coupled only to the top surface 604 of the substrate 602, it is to be understood that some or all of electrical components 650-652 also or alternatively could be coupled to the bottom surface 606 of the substrate 602.

RF module 600 also may include conductive interconnects (not numbered) forming portions of the M1 and/or M2 layers to provide routing (e.g., signal, ground, and so on) between the electrical components 650-652. In addition, RF module 660 includes conductive structures 660, 662 (e.g., I/O pads and/or other structures), which may be electrically coupled with corresponding I/O pads (or other structures) on another substrate (e.g., substrate 902, FIG. 9). Conductive structures 662 include floating pads, in an embodiment, which may be soldered to corresponding floating pads on another substrate (e.g., substrate 902, FIG. 9) to provide mechanical connection between RF module 600 and the other substrate. In alternate embodiments, RF module 600 and the other substrate may be mechanically connected using pins, glues, or other means. According to an embodiment, any bottom-surface conductive interconnects and conductive structures 660, 662 form portions of the lower metal layer (or M2).

As depicted in FIGS. 7 and 8, RF module 600 also includes conductive structures 680, 681 between antenna metal layer 810 (M1) and the bottom surface 606 of substrate 602, according to an embodiment. At the bottom surface 606, conductive structures 680, 681 optionally may be coupled to pads 804, 805, which may be formed as a portion of lower metal layer 820 (M2). More particularly, conductive structures 680, 681 are electrically connected to the distal ends 634, 635 of the antenna arms 612, 613, and conductive structures 680, 681 extend through substrate 602 to the bottom surface 606 of substrate 602 (e.g., to pads 804, 805). As will be explained in more detail in conjunction with FIGS. 9-12, conductive structures 680, 681 may be coupled (e.g., directly or using optional pads 804, 805) to tuning structures (e.g., tuning structures 910, 911, FIG. 9) on a top surface of another substrate (e.g., substrate 902, FIG. 9). The tuning structures are conductive structures that is configured to increase the electrical length of the antenna arms 612, 613 when the antenna arms 612, 613 are connected to the tuning structures using conductive structures 680, 681.

Desirably, conductive structures 680, 681 are configured to have approximately the same characteristic impedances as antenna arms 612, 613, in order to minimize reflections. Conductive structures 680, 681 each may be a single via, as shown in FIGS. 7 and 8, in an embodiment. In an alternate embodiment, conductive structures 680, 681 each may include a plurality of vias. In yet another alternate embodiment, conductive structures 680, 681 may be replaced by planar conductive interconnects, such as strips of metallization that wrap around edges of the substrate 602 between the distal ends 634, 635 of the antenna arms 612, 613 and the bottom surface 606 of the substrate 602. Conductive structures 680, 681 each may include a combination of one or more vias and planar conductive interconnects, in still other embodiments, or any other structures that provides electrical conductivity between the distal ends 634, 635 of the antenna arms 612, 613 and the tuning structures (e.g., tuning structures 910, 911, FIG. 9) on the substrate to which RF module 600 is attached. According to an embodiment, and as depicted in FIG. 8 (but not in FIGS. 6 and 7), RF module 600 also may include encapsulation material 802 overlying the dipole antenna 610, the electrical components 650-652, and the top surface 604 of the substrate 602.

Although the various embodiments discussed herein describe an RF module 600 with two metal layers (e.g., layers 810, 820, FIG. 8) and a single dielectric layer (e.g., substrate 602, FIG. 6) positioned between them, alternate embodiments may include three or more metal layers and two or more dielectric layers separating the three or more metal layers. Further, dipole antenna 610 may be included as part of a metal layer that is between the surface metal layers (i.e., metal layers other than surface metal layers), in various embodiments. Although such alternate embodiments are not discussed in detail herein, those of skill in the art would understand, based on the description, how to modify the various embodiments discussed herein to produce such a system.

Further, although various electrical components 650-652, conductive interconnects, and conductive structures 660, 662 are illustrated in FIGS. 6-8 in various positions, it is to be understood that the numbers and arrangements of electrical components 650-652, conductive interconnects, and conductive structures 660, 662 included in FIGS. 6-8 were selected to facilitate explanation of the various embodiments, and the selected numbers and arrangements, along with the depicted interconnections between electrical components 650-652, are not to be construed as limiting.

Figure 9:
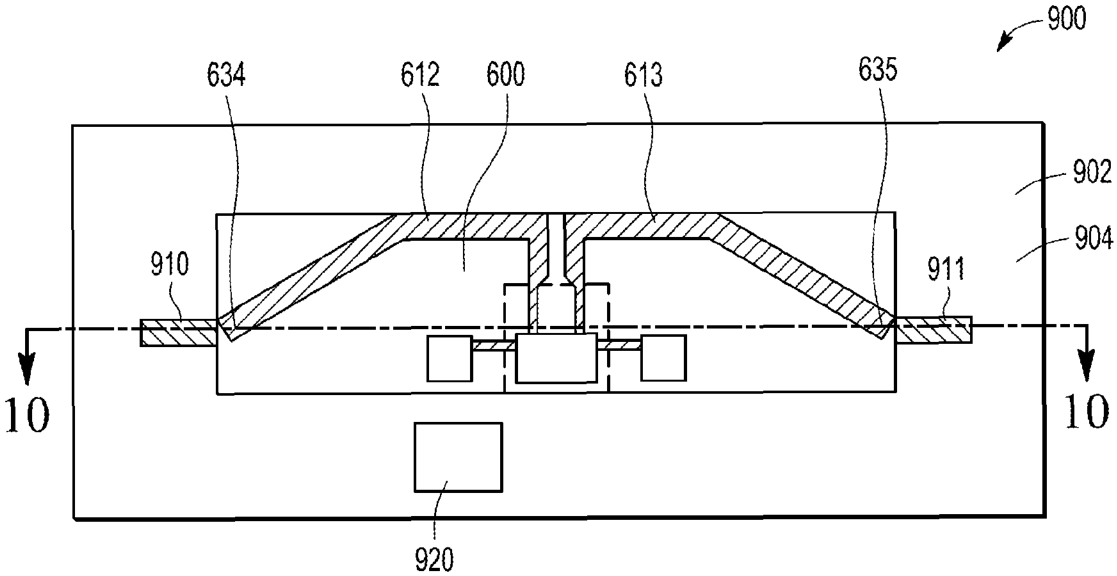
FIGS. 9 and 10 illustrate top and cross-sectional side views, respectively, of a system that includes an RF module (with a dipole antenna) coupled to a substrate that includes multiple tuning structures, according to an example embodiment.
Figure 10:
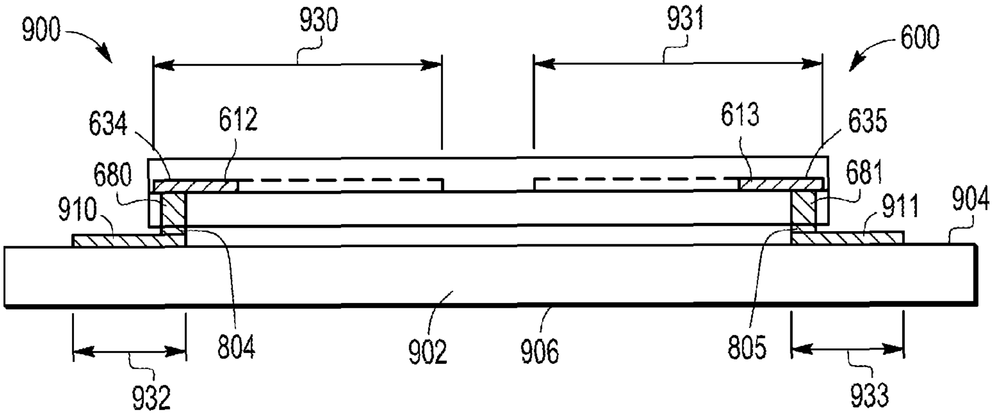

As mentioned above, embodiments of RF modules, such as RF module 600, may be incorporated into systems in which there is a desire to communicate information wirelessly. For example, FIGS. 9 and 10 illustrate top and cross-sectional side views, respectively, of a system 900 that includes an RF module (e.g., RF module 600 with dipole antenna 610) coupled to a substrate 902 (e.g., a PCB), according to an example embodiment. For convenience, the reference numbers used in FIG. 6 for various elements of RF module 600 are retained in FIGS. 9 and 10. In an embodiment, system 900 includes at least one non-RF component 920.

As discussed previously, RF module 600 includes a dipole antenna 610 and various electrical components (e.g., components 650-652, FIG. 6), which enable dipole antenna 610 to transmit RF signals over an air interface, receive RF signals from an air interface, or both. According to an embodiment, non-RF component 920 is configured to produce signals for transmission by RF module 600 and/or to consume signals produced by RF module 600 (based on RF signals that RF module 600 received from the air interface).

RF module 600, tuning structures 910, 911, and non-RF component 920 are mechanically coupled to substrate 902. For example, RF module 600 may be mechanically coupled to substrate 902 using at least one conductive structure (e.g., conductive structures 662, such as floating pads), which may be soldered to at least one corresponding conductive structure (e.g., other floating pads, not illustrated) on substrate 902. Non-RF component 920 may be similarly mechanically coupled to substrate 902. Alternatively, RF module 600 and/or non-RF component 920 may be mechanically coupled to substrate 902 using pins, glues, or other means. In addition, RF module 600 and non-RF component 920 may be electrically coupled to substrate 902 and to each other using various pads (not illustrated), vias (not illustrated), and conductive interconnects (not illustrated) on and/or through substrate 902. In this manner, RF module 600 and non-RF component 920 may exchange electrical signals.

According to an embodiment, RF module 600 is designed to have a particular resonant frequency and bandwidth. In order to ensure that the desired resonant frequency is not shifted significantly due to the dielectric constant and thickness of substrate 902, tuning structures 910, 911 are provided on substrate 902 to increase the electrical length of antenna arms 612, 613, according to an embodiment. The configuration of the tuning structures 910, 911 may be different on substrates having different dielectric constants and/or thicknesses, to ensure that the desired resonant frequency is achieved regardless of the dielectric constant and/or thickness of the substrate to which RF module 600 is coupled.

According to an embodiment, tuning structures 910, 911 each include a patterned, planar conductive structure (e.g., a portion of a conductive layer) on a top surface 904 of substrate 902. In other embodiments, tuning structures 910, 911 may be conductive structures other than patterned conductive structures. For example, tuning structures 910, 911 alternatively may be conductive bumps, balls, plates, or vias (e.g., vias into and/or through substrate 902). As discussed previously, tuning structures 910, 911 are configured to increase an electrical length of antenna arms 612, 613 when tuning structures 910, 911 are electrically coupled (e.g., using conductive structures 680, 681 and optional pads 804, 805) to the distal ends 634, 635 of antenna arms 612, 613. As shown in FIG. 9, tuning structures 910, 911 may have elongated shapes. The major axes (a horizontal axis in FIG. 9) may or may not (as illustrated) be parallel with the major axes of antenna arms 612, 613 (diagonal in FIG. 9).

The configuration of tuning structures 910, 911 define the percentage increase in the electrical lengths of antenna arms 612, 613 that tuning structures 910, 911 provide. For example, the relative differences between the physical lengths 930, 931 of antenna arms 612, 613 and the physical lengths 932, 933 of tuning structures 910, 911 may relate to the percentage increase in the electrical lengths of antenna arms 612, 613 that tuning structures 910, 911 provide. Those of skill in the art would understand, based on the description herein, however, that the physical lengths 932, 933 of tuning structures 910, 911 would not be the only factor in determining the percentage increase in the electrical lengths of antenna arms 612, 613 that tuning structures 910, 911 provide.

The resonant frequency of system 900 relates to the electrical length of the entire combination of antenna arms 612, 613, conductive structures 680, 681, and tuning structures 910, 911. According to an embodiment, tuning structures 910, 911 account for about 10 percent or less of the electrical lengths of each entire combination of antenna arms 612, 613, conductive structures 680, 681, and tuning structures 910, 911. According to another embodiment, tuning structures 910, 911 account for up to 50 percent of the electrical length of each entire combination of antenna arms 612, 613, conductive structures 680, 681, and tuning structures 910, 911. In still other embodiments, tuning structures 910, 911 may account for more than 50 percent of the entire electrical length of each combination.

Figure 11:
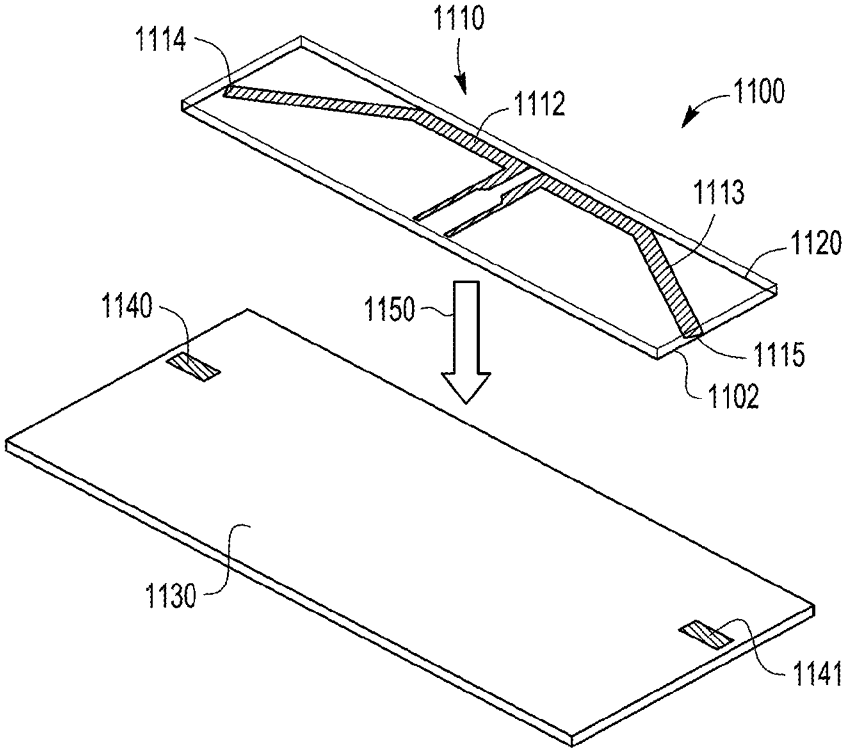
FIG. 11 illustrates a three-dimensional, exploded view of the system of FIGS. 9 and 10.
Figure 12:
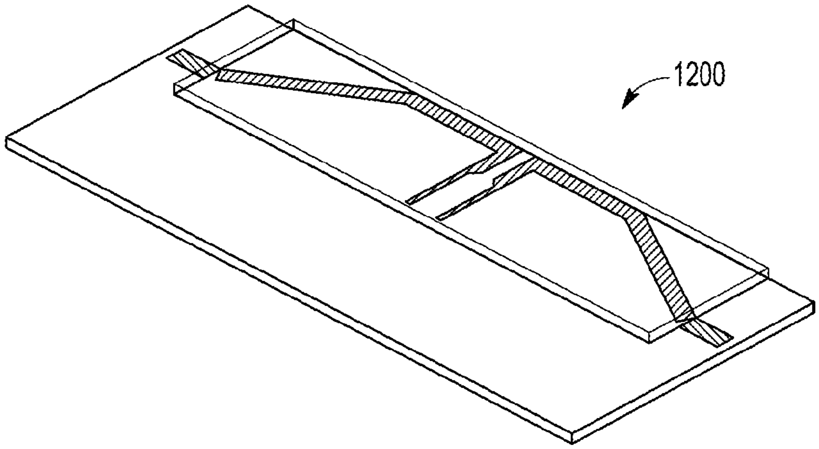
FIG. 12 illustrates a three-dimensional, assembled view of the system of FIGS. 9 and 10.

According to an embodiment, and as depicted in FIG. 3 (but not in FIGS. 1 and 2), RF module 100 also may include encapsulation material 302 overlying the PIFA 110, the electrical components 150-153, and the top surface 104 of the substrate 102. With encapsulation material 302, PIFA 110 and electrical components 150-153 are protected from environmental and mechanical damage, and To further illustrate the various embodiments, FIGS. 11 and 12 illustrate three-dimensional, exploded and assembled views of simplified versions of the system of FIGS. 9 and 10. As indicated in FIG. 11, RF module 1100 (which includes substrate 1102, dipole antenna 1110, and encapsulation 1120) is distinct from system substrate 1130 (which includes tuning structures 1140, 1141). To produce an assembled system 1200, RF module 1100 is brought into contact with system substrate 1130, as indicated by arrow 1150, and RF module 1100 and system substrate 1130 are aligned so that the conductive structures (e.g., conductive structures 680, 681, FIG. 6) at the distal ends 1114, 1115 of antenna arms 1112, 1113 align with the tuning structures 1140, 1141. The RF module 1100 is then mechanically affixed and electrically connected to the system substrate 1130 (e.g., using solder, glue, or other means). As one of skill in the art would understand, based on the description herein, a similar process could be used to interconnect an RF module with a different type of antenna with a system substrate.

In the various embodiments discussed above, an RF module (e.g., module 100, 600, FIGS. 1 and 6) has an antenna (e.g., inverted-F antenna 110, dipole antenna 610, FIGS. 1 and 6) on a top surface of a module substrate (e.g., substrate 102, 602, FIGS. 1 and 6). The RF module is then assembled with another substrate (e.g., substrate 402, 902, FIGS. 4 and 9) with a bottom surface of the RF module facing a top surface of the other substrate. In such embodiments, the antenna of the RF module is separated from the other substrate by the module substrate.

Figure 13:
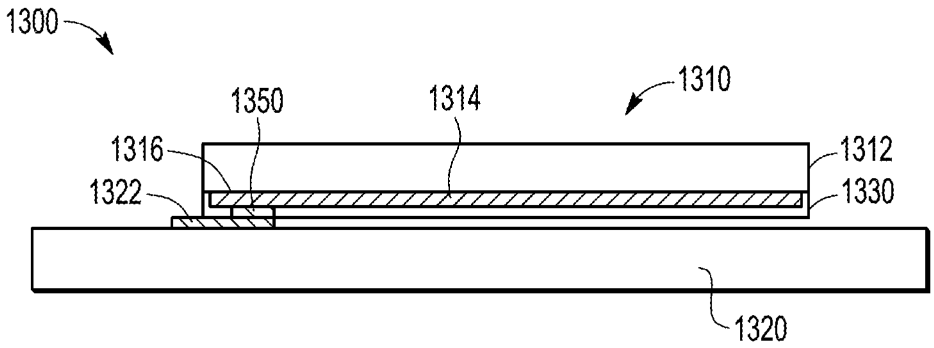
FIG. 13 illustrates a cross-sectional side view of a system that includes an RF module coupled with a substrate that includes a tuning structure, according to an alternate embodiment.

In an alternate embodiment, an RF module may be assembled with another substrate so that the side of the module substrate with the antenna is facing the other substrate (i.e., the RF module is flipped, with respect to the previously described embodiments. For example, FIG. 13 illustrates a cross-sectional side view of a system 1300 that includes an RF module 1310 coupled with a system substrate 1320 that includes a tuning structure 1322, according to an alternate embodiment. RF module 1310 may be similar to RF modules 100, 600, in that RF module 1310 includes a module substrate 1312 and an antenna that includes at least one antenna arm 1314. However, rather than covering the antenna arm 1314 with encapsulation material (e.g., encapsulation material 302, 802, FIGS. 3, 8), the antenna arm 1314 is instead covered with a non-conductive material layer 1330 (e.g., solder block). The layer 1330 includes an opening at a distal end 1316 of the antenna arm 1314, so that the distal end 1316 of the antenna arm 1314 can be electrically coupled (e.g., using solder 1350) to the tuning structure 1322 on the system substrate 1320. According to such an embodiment, conductive structures (e.g., conductive structures 180, 680, 681, FIGS. 1, 6) through the module substrate 1312 are not needed to electrically connect the distal end 1316 of the antenna arm 1314 to the tuning structure 1322. Instead, the distal end 1316 of the antenna arm 1314 is electrically connected to the tuning structure 1322 through the opening in the non-conductive material layer 1330.

Although particular system configurations are illustrated in FIGS. 4, 5, and 9-13, it is to be understood that the illustrated configurations are provided for example purposes only, and that a number of modifications could be made to systems 400, 900, and 1300 while still enjoying the benefits of the various embodiments. For example, although only a single RF module 100, 600 and non-RF component 420, 920 are illustrated in FIGS. 4, 5, and 9-12, other systems may include multiple RF modules 100, 600 and/or non-RF components 420, 920. In addition, although RF modules 100, 600, 1300 and non-RF components 420, 920 each are shown to be coupled to top sides of respective substrates 402, 902, 1320, either or both the RF modules 100, 600, 1300 or the non-RF components 420, 920 may be coupled to the bottom sides of substrates 402, 902, 1320.

Thus, various embodiments of antennas configured to enable the electrical length of their antenna arms to be extended, and modules and systems in which they are incorporated have been described above. An embodiment of an antenna includes a substrate, a first antenna arm coupled to the substrate, and a first conductive structure between a distal end of the first antenna arm and a bottom surface of the substrate.

An embodiment of an RF module includes a substrate, an antenna including a first antenna arm coupled to the substrate, and a first conductive structure between a distal end of the first antenna arm and a bottom surface of the substrate. Another embodiment of an RF module includes a first substrate, an antenna coupled to the first substrate, and a set of electrical components coupled to the first substrate and to the antenna. The set of electrical components is configured to receive a signal for transmission from a non-RF component that is separately packaged from the module, to convert the signal to an RF signal, and to provide the RF signal to the antenna for radiation over an air interface.

An embodiment of a system includes a first substrate, a first conductive structure on a top surface of the first substrate, and an antenna coupled to the top surface of the first substrate. The antenna includes a second substrate, a first antenna arm coupled to the second substrate, and a second conductive structure having a proximal end and a distal end. The proximal end of the second conductive structure is coupled to a distal end of the first antenna arm, and the distal end of the second conductive structure extends to a bottom surface of the second substrate and is coupled to the first conductive structure on the first substrate. Another embodiment of a system includes an antenna having a first substrate, a first antenna arm coupled to the first substrate, and a dielectric layer covering the first antenna arm and having a first opening at a distal end of the first antenna arm.

As used herein, the term "conductive structure" means a planar conductive structure, a pad, a via, a plurality of vias, a bump, a ball, a wire, or any combination thereof. As used herein, the term "pad" means a conductive connection between circuitry external to a package and circuitry internal to the package. A "pad" should be interpreted to include a pin, a pad, a bump, a ball, and any other conductive connection. The term "interconnect" means an input (I) conductor for a particular IC, an output (O) conductor for a particular IC, or a conductor serving a dual I/O purpose for a particular IC. In some cases, an interconnect may be directly coupled with a package pin, and in other cases, an interconnect may be coupled with an interconnect of another IC.

The terms "first," "second," "third," "fourth" and the like in the description and the claims, if any, may be used for distinguishing between similar elements or steps and not necessarily for describing a particular sequential or chronological order. It is to be understood that the terms so used are interchangeable under appropriate circumstances such that the embodiments described herein are, for example, capable of operation or fabrication in sequences or arrangements other than those illustrated or otherwise described herein. In addition, the sequence of processes, blocks or steps depicted in and described in conjunction with any flowchart is for example purposes only, and it is to be understood that various processes, blocks or steps may be performed in other sequences and/or in parallel, in other embodiments, and/or that certain ones of the processes, blocks or steps may be combined, deleted or broken into multiple processes, blocks or steps, and/or that additional or different processes, blocks or steps may be performed in conjunction with the embodiments. Furthermore, the terms "comprise," "include," "have" and any variations thereof, are intended to cover non-exclusive inclusions, such that a process, method, article, or apparatus that comprises a list of elements or steps is not necessarily limited to those elements or steps, but may include other elements or steps not expressly listed or inherent to such process, method, article, or apparatus.

It is to be understood that various modifications may be made to the above-described embodiments without departing from the scope of the inventive subject matter. While the principles of the inventive subject matter have been described above in connection with specific systems, apparatus, and methods, it is to be clearly understood that this description is made only by way of example and not as a limitation on the scope of the inventive subject matter. The various functions or processing blocks discussed herein and illustrated in the Figures may be implemented in hardware, firmware, software or any combination thereof. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A radio frequency (RF) module comprising:

a substrate; and a planar, inverted-F antenna including

- a first antenna arm formed on a top surface of the substrate,
- a first conductive structure coupled to a distal end of the first antenna arm at the top surface of the substrate and extending to a bottom surface of the substrate, wherein a portion of the first conductive structure at the bottom surface of the substrate is configured to be coupled to a second conductive structure on a separate substrate,
- a feed arm coupled to a proximal end of the first antenna arm,
- a ground structure, and
- a shorting arm coupled between the first antenna arm and the ground structure.

2. The module of claim 1, wherein the first antenna arm has a length in a range of about 10 millimeters to about 50 millimeters.

3. The module of claim 1, wherein the first conductive structure comprises:
one or more conductive vias extending through the substrate.

4. The module of claim 1, wherein the first conductive structure comprises:
a planar conductive interconnect at an edge of the substrate.

5. The module of claim 1, wherein the module further comprises:
encapsulation material overlying the first antenna arm and the top surface of the substrate.

6. A radio frequency (RF) module comprising:
a substrate; and
a dipole antenna including
a first antenna arm formed on a top surface of the substrate,
a first conductive structure coupled to a distal end of the first antenna arm at the top surface of the substrate and extending to a bottom surface of the substrate,
a second antenna arm formed on the top surface of the substrate, and
a second conductive structure coupled to a distal end of the second antenna arm at the top surface of the substrate and extending to the bottom surface of the substrate.

7. The module of claim 6, wherein the first conductive structure is selected from a group consisting of a via, a plurality of vias, a planar conductive interconnect, and a combination thereof.

8. The module of claim 6, wherein the module further comprises: an electrical component coupled to the top surface of the substrate, wherein the electrical component is selected from a group comprising a transmitter, a receiver, and a transceiver.

9. The module of claim 8, wherein the module further comprises:
encapsulation material overlying the first antenna arm, the electrical component, and the top surface of the substrate.

10. A system comprising:
a first substrate;
a first conductive structure on a top surface of the first substrate; and
an antenna formed on a second substrate that is distinct from the first substrate and coupled to the top surface of the first substrate, wherein the antenna includes
a first antenna arm coupled to the second substrate, and
a second conductive structure having a proximal end and a distal end, wherein the proximal end of the second conductive structure is coupled to a distal end of the first antenna arm, and the distal end of the second conductive structure extends to a bottom surface of the second substrate and is coupled to the first conductive structure on the first substrate.

11. The system of claim 10, wherein the first conductive structure is configured to increase an electrical length of the first antenna arm.

12. The system of claim 10, wherein the first conductive structure comprises a planar conductive structure.

13. The system of claim 10, wherein the second conductive structure is selected from a group consisting of a via, a plurality of vias, a planar conductive structure, and a combination thereof.

14. The system of claim 10, wherein the antenna is a planar, inverted-F antenna, and the antenna further comprises:
a ground structure;
a feed arm coupled to the first antenna arm; and
a shorting arm coupled between the first antenna arm and the ground structure.

15. The system of claim 10, further comprising:
a non-RF component coupled to the first substrate that produces a signal for transmission; and
a set of electrical components coupled to the second substrate and to the first antenna arm, wherein the set of electrical components is configured to receive the signal, convert the signal to an RF signal, and provide the RF signal to the first antenna arm for radiation over an air interface.

16. A system comprising:
a first substrate;
a first conductive structure on a top surface of the first substrate;
a second conductive structure on the top surface of the first substrate; and
a dipole antenna coupled to the top surface of the first substrate, wherein the dipole antenna includes
a second substrate,
a first antenna arm coupled to the second substrate,
a third conductive structure having a proximal end and a distal end, wherein the proximal end of the third conductive structure is coupled to a distal end of the first antenna arm, and the distal end of the third conductive structure extends to a bottom surface of the second substrate and is coupled to the first conductive structure on the first substrate,
a second antenna arm coupled to the second substrate, and
a fourth conductive structure having a proximal end and a distal end, wherein the proximal end of the fourth conductive structure is coupled to a distal end of the second antenna arm, and the distal end of the fourth conductive structure extends to the bottom surface of the second substrate and is coupled to the second conductive structure on the first substrate.

17. A system comprising:
a dipole antenna that includes
a first substrate,
a first antenna arm formed on a surface of the first substrate,
a second antenna arm formed on the surface of the first substrate, and
a dielectric layer formed over the surface of the first substrate and covering the first antenna arm and the second antenna arm and having a first opening that exposes a distal end of the first antenna arm, and a second opening that exposes a distal end of the second antenna arm;
a second substrate; and
a first conductive structure on the top surface of the second substrate, wherein the distal end of the first antenna arm is coupled to the first conductive structure through the first opening in the dielectric layer.

18. The system of claim 17, further comprising:
a second conductive structure on a top surface of the second substrate, and
wherein the distal end of the second antenna arm is coupled to the second conductive structure through the second opening in the dielectric layer.

19. A system comprising:

an antenna that includes a first substrate, a first antenna arm formed on a surface of the first substrate, and a dielectric layer formed over the surface of the first substrate and covering the first antenna arm and having a first opening that exposes a distal end of the first antenna arm, wherein the antenna is a planar, inverted-F antenna, and the antenna further comprises:

a ground structure;

a feed arm coupled to the first antenna arm; and a shorting arm coupled between the first antenna arm and the ground structure.

* * * * *